(12) United States Patent
Reeves et al.

(10) Patent No.: US 9,284,972 B1
(45) Date of Patent: Mar. 15, 2016

(54) PANEL-INSERT ASSEMBLY AND METHOD

(71) Applicant: The Boeing Company, Chicago, IL (US)

(72) Inventors: Brad J. Reeves, Everett, WA (US); James S. Bradley, Arlington, WA (US); Michael S. Lewis, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/543,147

(22) Filed: Nov. 17, 2014

(51) Int. Cl.
*F16B 5/01* (2006.01)
*F16B 21/02* (2006.01)
*F16B 5/02* (2006.01)

(52) U.S. Cl.
CPC . *F16B 21/02* (2013.01); *F16B 5/01* (2013.01); *F16B 5/02* (2013.01); *F16B 5/0208* (2013.01)

(58) Field of Classification Search
CPC ............ F16B 5/01; F16B 5/02; F16B 5/0208; F16B 5/0275; F16B 5/0291; F16B 5/008; F16B 5/0621; F16B 21/02; F16B 23/00
See application file for complete search history.

(56) References Cited

U.S. PATENT DOCUMENTS

| | | | | |
|---|---|---|---|---|
| 3,451,181 A | * | 6/1969 | Neuschotz | .................... 52/787.1 |
| 3,662,805 A | * | 5/1972 | Sygnator | ................... F16B 5/01 29/455.1 |
| 3,766,636 A | * | 10/1973 | Sygnator | ................... F16B 5/01 29/525.02 |
| 5,082,405 A | | 1/1992 | Witten | |
| 5,240,543 A | | 8/1993 | Fetterhoff | |
| 8,506,224 B2 | * | 8/2013 | Cosenza | ............... F16B 5/0208 411/353 |
| 8,950,969 B2 | * | 2/2015 | Klaukien | .................. F16B 5/01 244/131 |

* cited by examiner

*Primary Examiner* — Andrew J Triggs
(74) *Attorney, Agent, or Firm* — Walters & Wasylyna LLC

(57) ABSTRACT

A panel-insert assembly including a panel and an insert, wherein the panel includes a core and a face sheet positioned over the core, wherein the face sheet defines an opening therein, and wherein the insert is positioned below the face sheet and includes a thread member engaged with the panel, the thread member extending in a first circumferential direction about the vertical axis.

14 Claims, 10 Drawing Sheets

PANEL-INSERT ASSEMBLY AND METHOD

FIELD

This application relates to sandwich panels and, more particularly, to sandwich panels having an insert, such as a threaded insert, connected thereto.

BACKGROUND

Sandwich panels are typically formed from a core sandwiched between two face sheets. The core may be relatively thick, yet lightweight, as compared to the face sheets. The face sheets may be relative thin, yet stiff. Therefore, sandwich panels typically possess relatively high strength and stiffness at relatively low weight.

Because of their relatively high strength and stiffness at relatively low weight, sandwich panels are widely used in various aerospace applications. For example, sandwich panels are used in the construction of aircraft, such as commercial aircraft. Specifically, sandwich panels are used as the flooring, walls and bulkheads that define the passenger cabin of an aircraft. Therefore, such sandwich panels often are connected to the airframe of the aircraft such that loads applied to the sandwich panels are transferred to the airframe.

Connecting a sandwich panel to an airframe is typically effected with mechanical fasteners, such as bolts, that engage threaded inserts connected to the sandwich panel. The threaded inserts are typically potted (with an adhesive) into appropriately sized holes formed in the sandwich panel. The adhesives commonly used require long cure times, add undesired weight, and offer only limited pull strength protection since the load is transferred to the panel only through the adhesive. Also, care must be taken such that the threaded inserts are not placed too high in the holes relative to the outer surface of the associated face sheet, which may result in a gap being formed, or placed too low in the holes relative to the outer surface of the associated face sheet, which may result in unintentional pullout during tightening of the mechanical fastener.

Accordingly, those skilled in the art continue with research and development efforts in the field of sandwich panels.

SUMMARY

In one embodiment, the disclosed panel-insert assembly may include a panel and an insert, wherein the panel includes a core and a face sheet positioned over the core, wherein the face sheet defines an opening therein, and wherein the insert is positioned below the face sheet and includes a thread member engaged with the panel.

In another embodiment, the disclosed insert may include a body defining a vertical axis and having an engagement surface, an underside surface axially opposed from the engagement surface, and an outer periphery, the body defining a bore aligned with the vertical axis and a thread member extending in a first circumferential direction about the vertical axis, wherein the thread member protrudes downward below the underside surface.

In yet another embodiment, disclosed is a method for connecting an insert to a panel, the panel including a core and a face sheet, the method including (1) forming an opening in the face sheet; (2) positioning the insert over the opening; and (3) rotating the insert relative to the opening to urge the insert through the opening and below the face sheet.

Other embodiments of the disclosed panel-insert assembly and method will become apparent from the following detailed description, the accompanying drawings and the appended claims.

DETAILED DESCRIPTION

Figure 1:
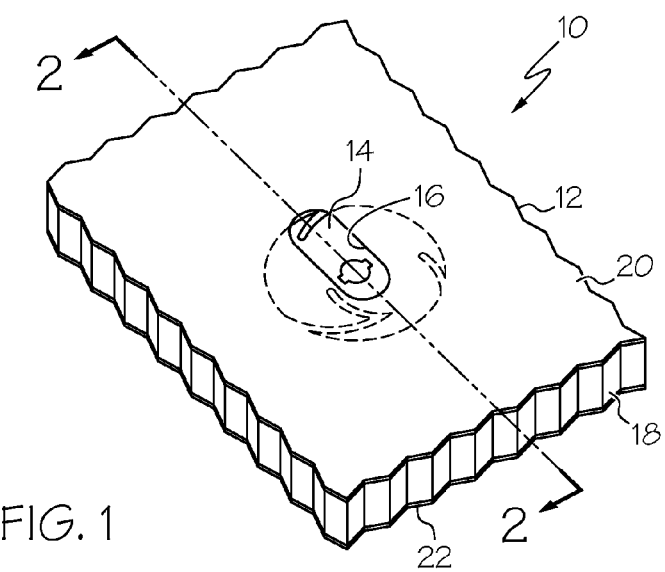
FIG. 1 is a perspective view of one embodiment of the disclosed panel-insert assembly.
Figure 2:
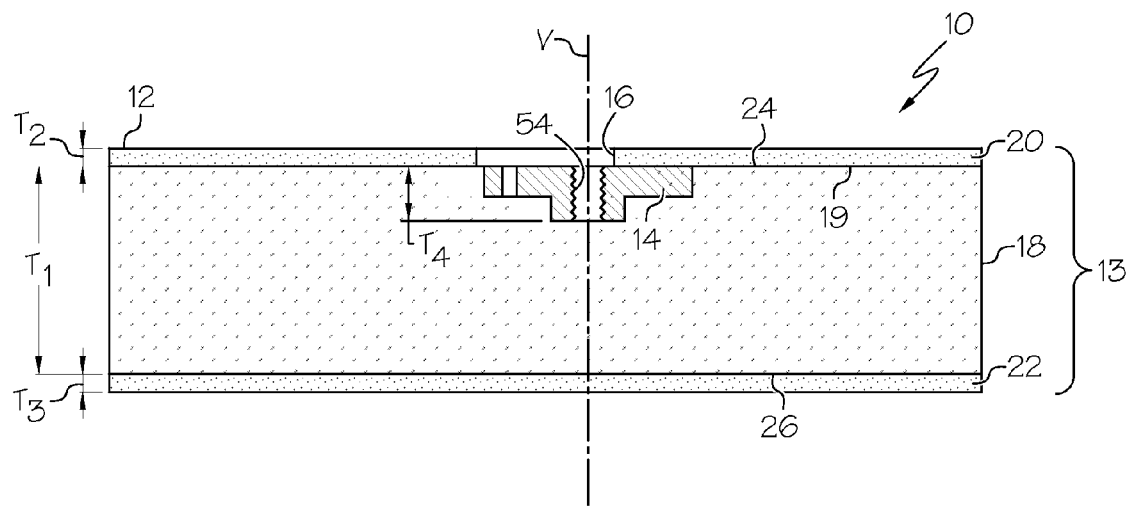
FIG. 2 is a cross-sectional view of the panel-insert assembly of FIG. 1.
Figure 3:
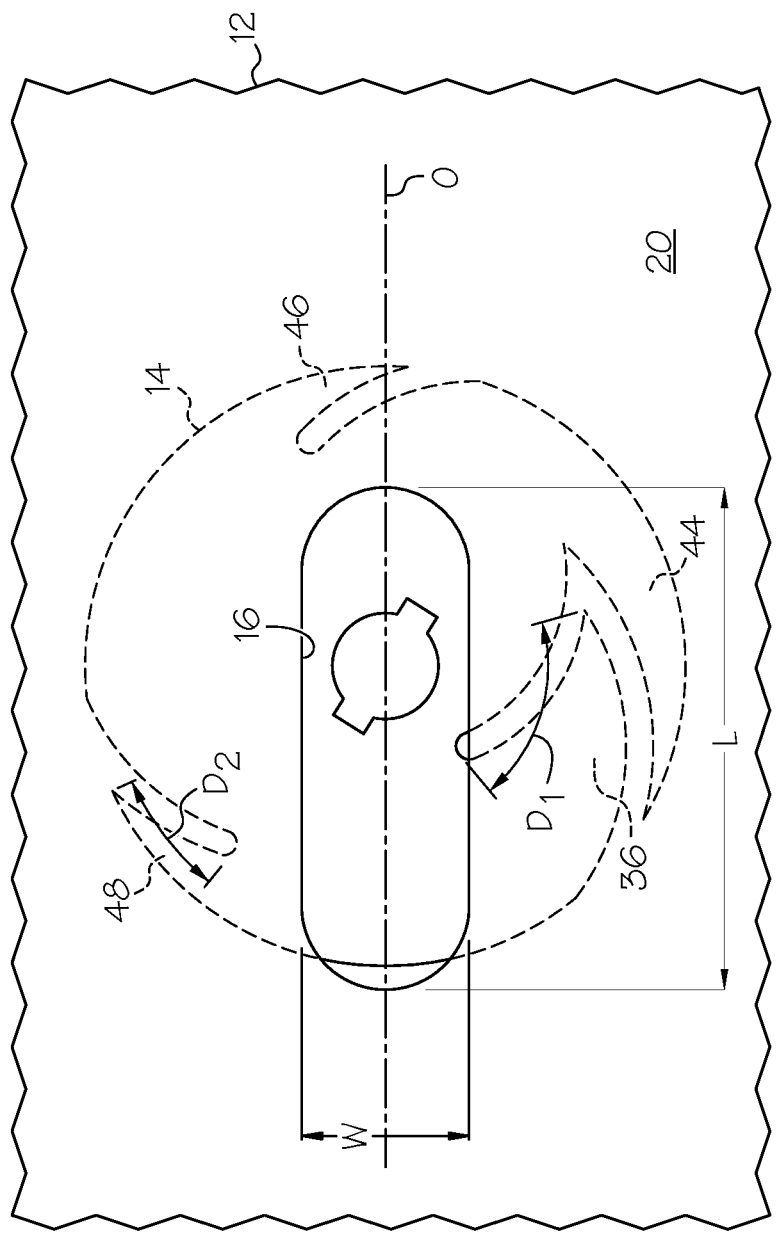
FIG. 3 is a top plan view of the panel-insert assembly of FIG. 1.

Referring to FIGS. 1-3, one embodiment of the disclosed panel-insert assembly, generally designated 10, may include a sandwich panel 12 and an insert 14. The insert 14 may be inserted through an opening 16 in the sandwich panel 12 by rotating the insert 14 about a vertical axis V (FIG. 2) relative to the sandwich panel 12 (effectively screwing the insert 14 into the sandwich panel 12), as is described herein.

As best shown in FIG. 2, the sandwich panel 12 may include a layered structure 13 that includes a core 18, a first face sheet 20 and a second face sheet 22. The insert 14 may be positioned below the first face sheet 20, thereby providing better load transfer between the insert 14 and the sandwich panel 12 (as opposed to a potted insert).

While the layered structure 13 of the sandwich panel 12 is shown with three layers 18, 20, 22, additional layers, such as additional core layers, additional face sheets and/or additional other layers, may be included without departing from the scope of the present disclosure. The second face sheet 22 may be optional and, therefore, may be omitted from the layered structure 13 of the sandwich panel 12 without departing from the scope of the present disclosure.

The core 18 of the sandwich panel 12 may include a first major side 24 and an opposed second major side 26. The first face sheet 20 may be connected (e.g., adhered, welded, braised, mechanically fastened etc.) to the first major side 24 of the core 18 and the second face sheet 22 may be connected (e.g., adhered, welded, braised, mechanically fastened etc.) to the second major side of the core 18, thereby sandwiching the core 18 between the first face sheet 20 and the second face sheet 22.

The cross-sectional thickness $T_1$ of the core 18 of the sandwich panel 12 may be relatively thick, as compared to the cross-sectional thicknesses $T_2$, $T_3$ of the first face sheet 20 and the second face sheet 22 (e.g., $T_1 > T_2$ and $T_1 > T_3$). For example, the cross-sectional thickness $T_1$ of the core 18 may be two or more times greater (e.g., five times greater) than the cross-sectional thickness $T_2$ of the first face sheet 20. However, the core 18 may have a relatively lower density (basis weight divided by cross-sectional thickness), as compared to the densities of the first face sheet 20 and the second face sheet 22.

Structurally, the core 18 of the sandwich panel 12 may be solid. However, lower densities may be achieved using a non-solid structure. As one specific, non-limiting example, the core 18 may be (or may include) a foam. As another specific, non-limiting example, the core 18 may be fluted or may include fluting. As yet another specific, non-limiting example, the core 18 may be (or may include) a honeycomb structure.

Compositionally, the core 18 may be formed from the same, similar or different materials than the first 20 and second 22 face sheets. However, the core may typically be a structure with less density than the face sheets 20, 22. As one specific, non-limiting example, the core 18 may be formed from a polymer (e.g., expanded polystyrene). As another specific, non-limiting example, the core 18 may be a honeycomb structure formed from a composite, such as a carbon fiber-reinforced composite or a fiberglass composite. As yet another specific, non-limiting example, the core 18 may be a honeycomb structure formed from a ceramic or metal, such as titanium, steel, aluminum or an aluminum alloy.

The first face sheet 20, which may be single ply or multi-ply, may be any material capable of being layered over and connected to the core 18. As one specific, non-limiting example, the first face sheet 20 may be a polymer, such as a polymer film, sheet or mesh. As another specific, non-limiting example, the first face sheet 20 may be a composite, such as a carbon fiber-reinforced composite or a fiberglass composite. As another specific, non-limiting example, the first face sheet 20 may be a ceramic. As yet another specific, non-limiting example, the first face sheet 20 may be a metal film, sheet or mesh.

The second face sheet 22, which may be single ply or multi-ply, may be formed from the same, similar or different material than the first face sheet 20. As one specific, non-limiting example, the second face sheet 22 may be a polymer, such as a polymer film, sheet or mesh. As another specific, non-limiting example, the second face sheet 22 may be a composite, such as a carbon fiber-reinforced composite or a fiberglass composite. As yet another specific, non-limiting example, the second face sheet 22 may be a metal film, sheet or mesh.

In FIG. 1, only a portion of a sandwich panel 12 is shown. Those skilled in the art will appreciate that the overall size and shape of the sandwich panel 12 may depend on the end application. For example, the sandwich panel 12 may be used to construct the passenger cabin of an aircraft and, therefore, may be sized and shaped accordingly. Additionally, while the sandwich panel 12 is shown in FIGS. 1-3 as being a substantially planar structure, non-planar sandwich panels 12 (e.g., curved sandwich panels 12) are also contemplated.

Still referring to FIGS. 1-3, the opening 16 in the sandwich panel 12 may be formed in the first face sheet 20. The opening 16 may extend through the cross-sectional thickness $T_2$ of the first face sheet 20. Therefore, the opening 16 may provide access to the core 18 positioned below the first face sheet 20. As is described herein, the opening 16 may facilitate connecting the insert 14 to the sandwich panel 12 by insertion of the insert 14 below the first face sheet 20 by way of the opening 16.

As best shown in FIG. 3, the opening 16 in the first face sheet 20 of the sandwich panel 12 may have a maximum length L and a maximum width W that allow the insert 14 to pass therethrough. The width W of the opening 16 may be dictated by the cross-sectional thickness $T_4$ (FIG. 2) of the insert 14, among other possible factors. The length L of the opening 16 may extend along an opening axis O, and may be greater than the width W (e.g., the opening 16 may be elongated), and the length L may be dictated by a major dimension D of the insert 14.

As best shown in FIGS. 1 and 3, the opening 16 in the first face sheet 20 of the sandwich panel 12 may be round in plan view. However, openings 16 of various shapes may be used without departing from the scope of the present disclosure. For example, while not shown in the drawings, the opening 16 may be rectangular, trapezoidal, irregular or the like.

The opening 16 in the first face sheet 20 of the sandwich panel 12 may be formed using various techniques. As one non-limiting example, the opening 16 may be formed by cutting out, such as with a blade, a portion of the first face sheet 20. As another non-limiting example, the opening 16 may be formed by machining, such as with a router, a portion of the first face sheet 20.

Figure 4:
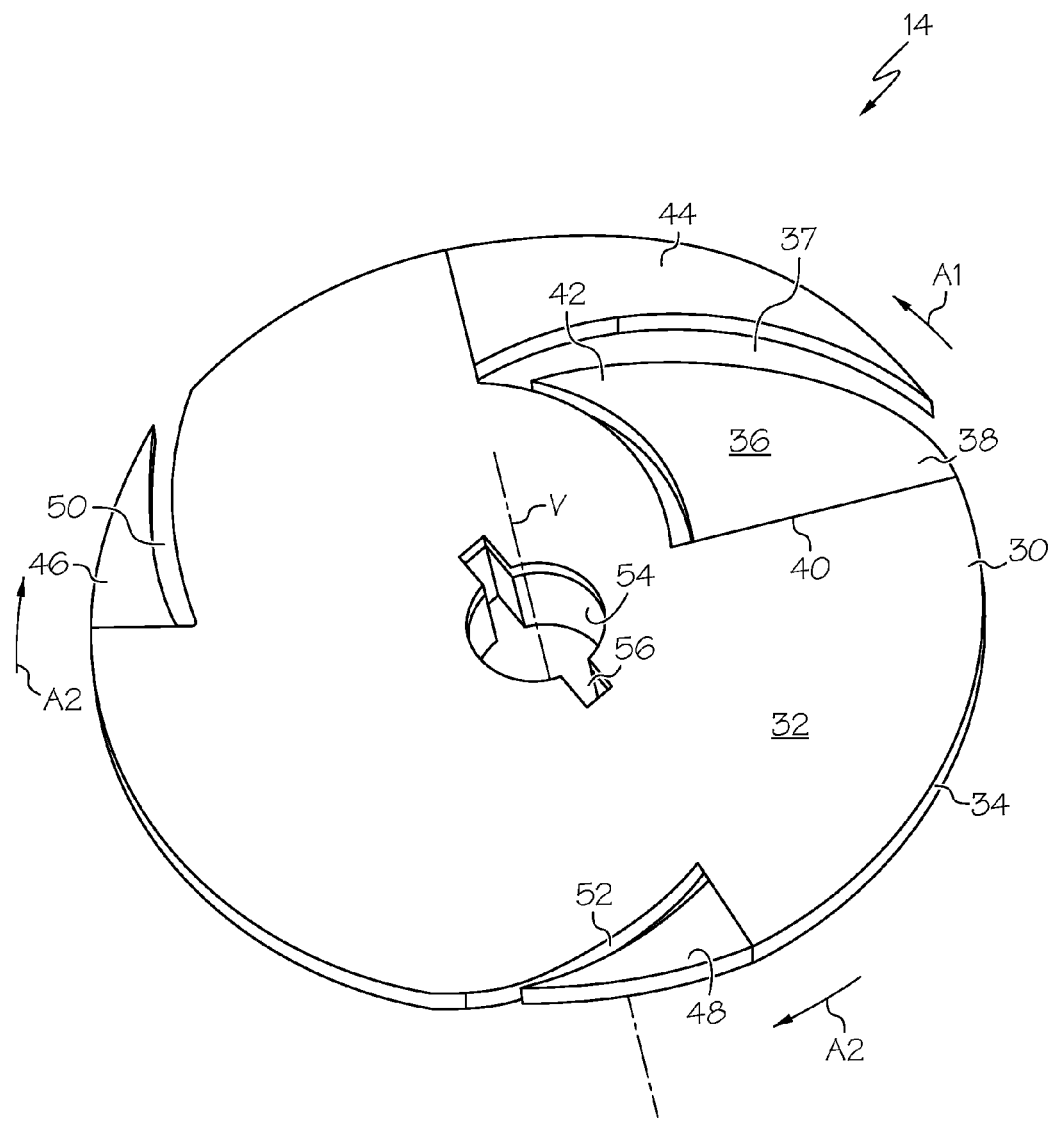
FIG. 4 is a top perspective view of the insert of the panel-insert assembly of FIG. 1.
Figure 5:
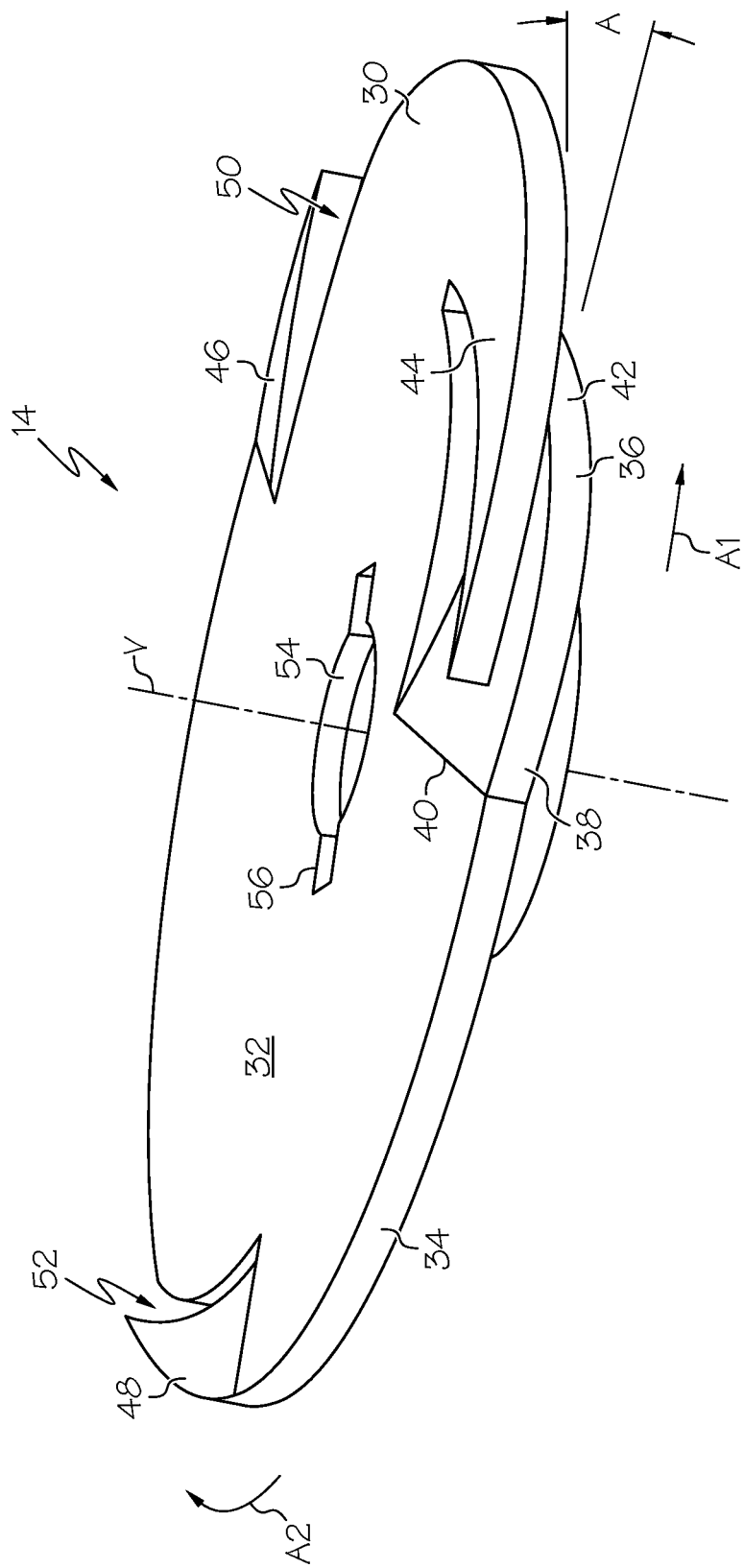
FIG. 5 is a side perspective view of the insert of FIG. 4.
Figure 6:
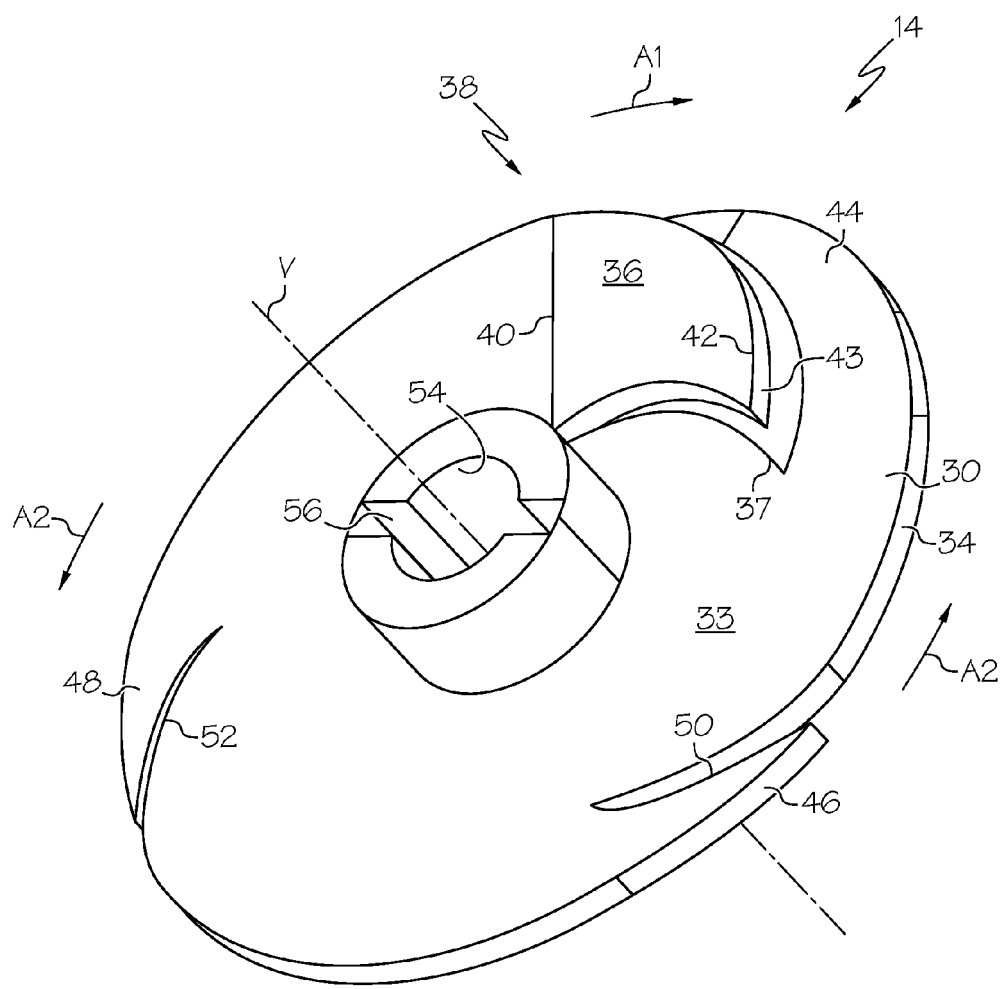
FIG. 6 is bottom perspective view of the insert of FIG. 4.

Referring to FIGS. 4-6, the insert 14 may include a body 30 having an engagement surface 32 (FIG. 4), an underside surface 33 (FIG. 6) axially opposed (relative to vertical axis V) from the engagement surface 32, and an outer periphery 34. The engagement surface 32 of the body 30 of the insert 14 may be substantially planar, thereby allowing the engagement surface 32 to flushly abut the inner surface 19 of the first face sheet 20 when the insert 14 is inserted into the sandwich panel 12 below the first face sheet 20, as shown in FIGS. 1-3. However, those skilled in the art will appreciate that the engagement surface 32 of the body 30 of the insert 14 need not be planar, but rather may be shaped/contoured (e.g., curved) to closely correspond with the shape/contour (if any) of the first face sheet 20 below which the insert 14 is positioned.

The body 30 of the insert 14 may be disc-shaped. For example, the body 30 may be relatively thin and the outer periphery 34 of the body 30 may be substantially circular when viewed along the vertical axis V (FIGS. 4-6) of the insert 14. Therefore, the major dimension D (FIG. 3) of the insert 14 may be the diameter of the body 30. However, inserts 14 of various shapes may be constructed with the disclosed features (e.g., thread member 36) without departing from the scope of the present disclosure, provided that such inserts 14 may be rotated into an opening 16 in the first face sheet 20 of a sandwich panel 12, as is described herein.

The body 30 of the insert 14 may define a thread member 36. While the body 30 is shown and described having only one thread member 36, those skilled in the art will appreciate that an insert 14 may include two or more thread members without departing from the scope of the present disclosure.

The thread member 36 may engage the sandwich panel 12 to axially urge (along vertical axis V) the insert 14 into the sandwich panel 12 (by way of the opening 16) when the insert 14 is rotated about the vertical axis V. Therefore, the thread member 36 may be any physical feature on the body 30 of the insert 14 that converts rotational motion of the insert 14 into axial motion sufficient to drive the insert 14 through the opening 16 in the sandwich panel 12 and, ultimately, into position below the first face sheet 20 of the sandwich panel 12.

As shown in FIGS. 4-6, the thread member 36 may be formed by cutting a channel 37 from the outer periphery 34 inward into the body 30 of the insert 14, and then bending the thread member 36 relative to the body 30 along a bend line 40. The channel 37 may be shaped to define the thread member 36. As one specific, non-limiting example, the thread member 36 may be curved and/or horn-shaped, and may include a base portion 38 and a distal end portion 42 opposed from the base portion 38. The base portion 38 of the thread member 36 may be located proximate the bend line 40. The distal end portion 42 of the thread member 36 may terminate at a pointed tip 43 (see FIG. 6).

The thread member 36 may generally circumferentially extend a distance $D_1$ (see FIG. 3) in a first circumferential direction $A_1$ (e.g., counterclockwise) about the vertical axis V (FIGS. 4-6). For example, as best shown in FIG. 3, the circumferential distance $D_1$ that the thread member 36 extends may be more than about 45 degrees and less than about 90 degrees about the vertical axis V.

Furthermore, the thread member 36 may protrude downward below the engagement surface 32 of the body 30. As best shown in FIG. 5, the thread member 36 may be bent along the bend line 40 such that the thread member 36 is disposed at an angle A relative to the engagement surface 32 of the body 30. For example, the angle A may range from about 2 degrees to about 40 degrees, such as about 5 degrees to about 25 degrees, or about 10 degrees to about 20 degrees.

Inasmuch as the thread member 36 extends downwardly (relative to the engagement surface 32) and circumferentially (relative to vertical axis V), the thread member 36 may effectively be a helix (or a partial helix). Therefore, when the insert 14 is rotated about the vertical axis V in the first circumferential direction $A_1$, the thread member 36 may engage the sandwich panel 12 to axially urge (along vertical axis V) the insert 14 into the sandwich panel 12 (by way of the opening 16).

The body 30 of the insert 14 may further define locking teeth 44, 46, 48. While the body 30 of the insert 14 is shown and described having three locking teeth 44, 46, 48, those skilled in the art will appreciate that an insert 14 may include fewer than three locking teeth or more than three locking teeth, without departing from the scope of the present disclosure.

After the insert 14 has been inserted into a sandwich panel 12 (FIG. 2), the locking teeth 44, 46, 48 may resist rotation of the insert 14 in a second circumferential direction $A_2$ (e.g., clockwise) opposite of the first circumferential direction $A_1$ (e.g., counterclockwise). Specifically, in the event the insert 14 is rotated in the second circumferential direction $A_2$ (e.g., when a mechanical fastener is being secured to the insert 14), the locking teeth 44, 46, 48 may engage (e.g., cut into) the sandwich panel 12 (e.g., into the core 18 of the sandwich panel 12), thereby inhibiting (if not absolutely preventing) further rotation of the insert 14 in the second circumferential direction $A_2$.

The locking teeth 44, 46, 48 may be formed by cutting channels 37, 50, 52 from the outer periphery 34 inward into the body 30 of the insert 14. Locking tooth 44 may be defined by channel 37, which also defines the thread member 36. Locking teeth 46, 48 may be defined by channels 50, 52, respectively, which may be shaped to give the locking teeth 46, 48 the desired shape.

The locking teeth 44, 46, 48 may generally circumferentially extend a distance $D_2$ (see FIG. 3) in a second circumferential direction $A_2$ (e.g., clockwise) about the vertical axis V (FIGS. 4-6). For example, as best shown in FIG. 3, the circumferential distance $D_2$ that the locking teeth 44, 46, 48 extend may be less than about 90 degrees about the vertical axis V.

In one variation, the locking teeth 44, 46, 48 may protrude upward above the engagement surface 32 of the body 30. For example, like the thread member 36 which is bent downward, the locking teeth 44, 46, 48 may be bent along bend lines, but in the opposite direction (e.g., upward). Therefore, the locking teeth 44, 46, 48 may rotationally engage the inner surface 19 (FIG. 2) of the first face sheet 20 when the insert 14 is inserted into the sandwich panel 12.

Thus, the locking teeth 44, 46, 48 may serve an anti-reverse function once the insert 14 has been installed in a sandwich panel 12 (FIG. 1). Specifically, in the event a rotational force is applied to the insert 14 that might otherwise (in the absence of locking teeth 44, 46, 48) urge the insert 14 about the vertical axis V in the second circumferential direction $A_2$, the locking teeth 44, 46, 48 may engage the sandwich panel 12 and resist rotation of the insert 14 in the second circumferential direction $A_2$.

The body 30 of the insert 14 may define a bore 54 therein. The bore 54 may be aligned with the vertical axis V (FIGS. 4-6), and may be sized and shaped to receive and engage a mechanical fastener, such as a screw, a bolt, a rivet or the like. In one particular implementation, the bore 54 of the insert 14 may be threaded to receive and engage a threaded fastener (e.g., a screw or a bolt).

Optionally, the portion of the body 30 surrounding the bore 54 may have a greater cross-sectional thickness $T_4$ than the rest of the body 30 to provide the bore 54 with greater depth. For example, the body 30 of the insert 14 may have a generally flanged or T-shaped cross-sectional profile, as shown in FIG. 2. At this point, those skilled in the art will appreciate that providing the insert 14 with a deeper threaded bore 54 may facilitate a stronger connection between the insert 14 and a threaded mechanical fastener.

The insert 14 may be formed from various materials or combination of materials. As one general, non-limiting example, the insert 14 may be formed from metal, such as steel. As another general, non-limiting example, the insert 14 may be formed from a polymer, such as polyethylene terephthalate. As another general, non-limiting example, the insert 14 may be formed from a combination of materials, such as a polymer body having a metallic threaded insert (defining the bore 54) connected thereto. For example, the metallic threaded insert may be press-fit into the polymer body. As yet another general, non-limiting example, the insert 14 may be formed from a combination of materials, such as a ceramic body having a metallic threaded insert (defining the bore 54) connected thereto. For example, the metallic threaded insert may be press-fit into the ceramic body. As one specific, non-limiting example, the insert 14 may be a steel, such as a stainless steel, nut plate.

Figure 10:
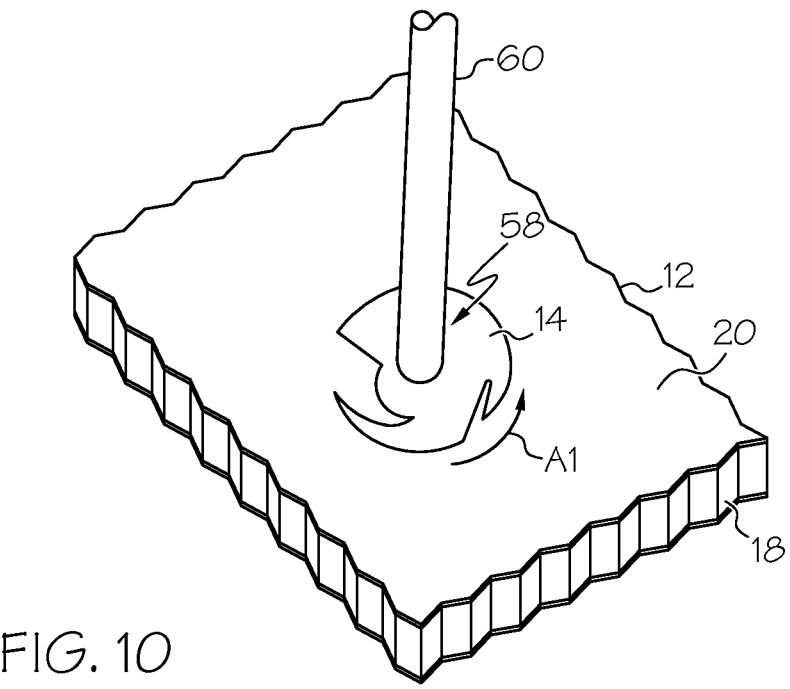
FIG. 10 is one perspective view of the rotating step of the method shown in FIG. 7.
Figure 11:
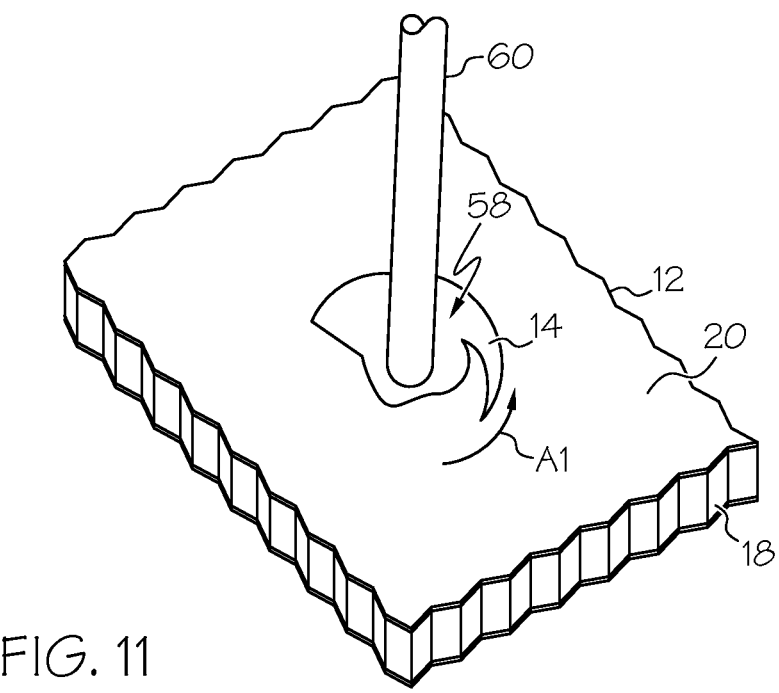
FIG. 11 is another perspective view of the rotating step of the method shown in FIG. 7.
Figure 12:
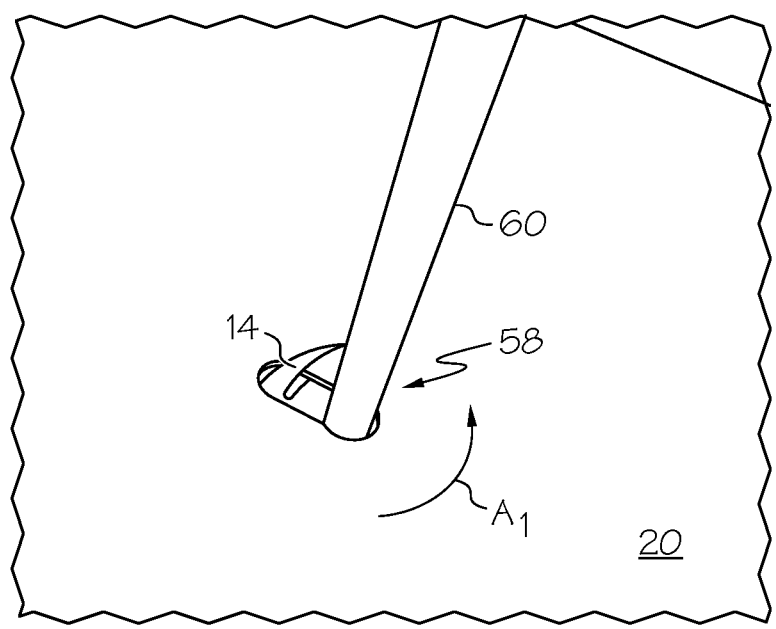
FIG. 12 is another perspective view of the rotating step of the method shown in FIG. 7.

The body 30 of the insert 14 may further define a recess 56 therein to facilitate rotating the insert 14 about the vertical axis V. The recess 56 may be sized and shaped to receive and engage the working end 58 (FIG. 10) of a driver tool 60 (FIG. 10). As shown in FIG. 4, the recess 56 may be superimposed over the bore 54 (e.g., both the bore 54 and the recess 56 may be coaxially aligned with the vertical axis V), though other configurations are also contemplated (e.g., two spaced apart pinhole-type recesses 56). As one specific, non-limiting example, the recess 56 may be formed as an elongated slot to receive a flathead screwdriver or the like. As another specific, non-limiting example, the recess 56 may be sized and shaped to receive a Phillips head screwdriver.

As shown in FIGS. 1-3, the insert 14 may be connected to the sandwich panel 12 by inserting the insert 14 through the opening 16 in the first face sheet 20 such that the insert 14 is positioned below the first face sheet 20 (e.g., between the first face sheet 20 and the core 18). Insertion of the insert 14 may be effected by positioning the insert 14 over the opening 16 in the first face sheet 20 and then rotating the insert 14 in the first circumferential direction $A_1$ about the vertical axis V until the entire insert 14 has passed through the opening 16 and is positioned below the first face sheet 20.

Figure 7:
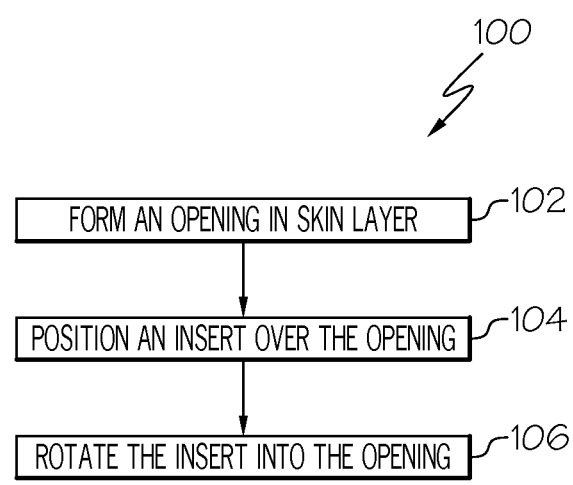
FIG. 7 is a flow chart depicting one embodiment of the disclosed method for connecting an insert to a sandwich panel.

Also disclosed is a method for connecting an insert to a sandwich panel. One embodiment of the disclosed method is shown in FIG. 7 and is generally designated 100. The method 100 is described below with references to FIGS. 8-13. Additional steps may be included in the disclosed method 100 without departing from the scope of the present disclosure.

Figure 8:
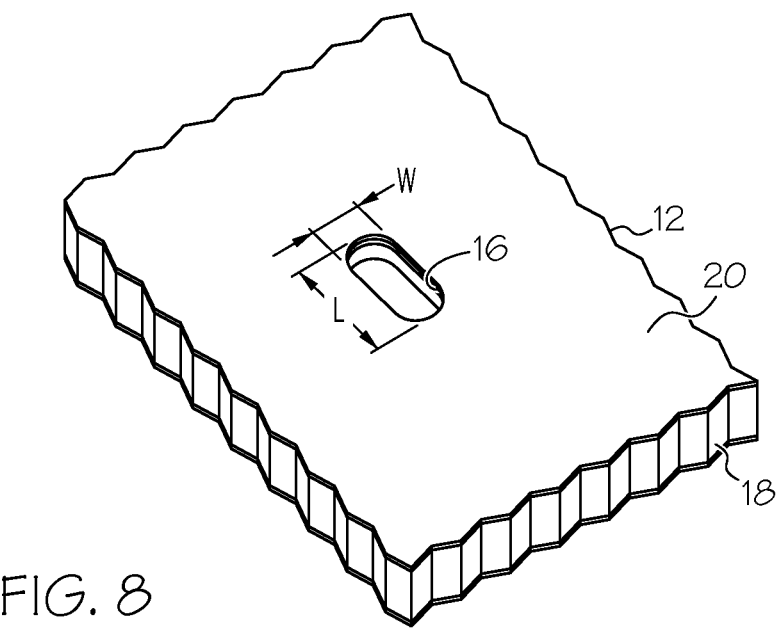
FIG. 8 is a perspective view of the opening forming step of the method shown in FIG. 7.

At Block 102, the method 100 may begin with the step of forming an opening 16 in the first face sheet 20 of the sandwich panel 12, as shown in FIG. 8. The opening 16 may extend through the first face sheet 20 (down to the core 18), and may have a length L and a width W. The opening 16 may be formed by cutting, machining or the like the first face sheet 20 of the sandwich panel 12.

Figure 9:
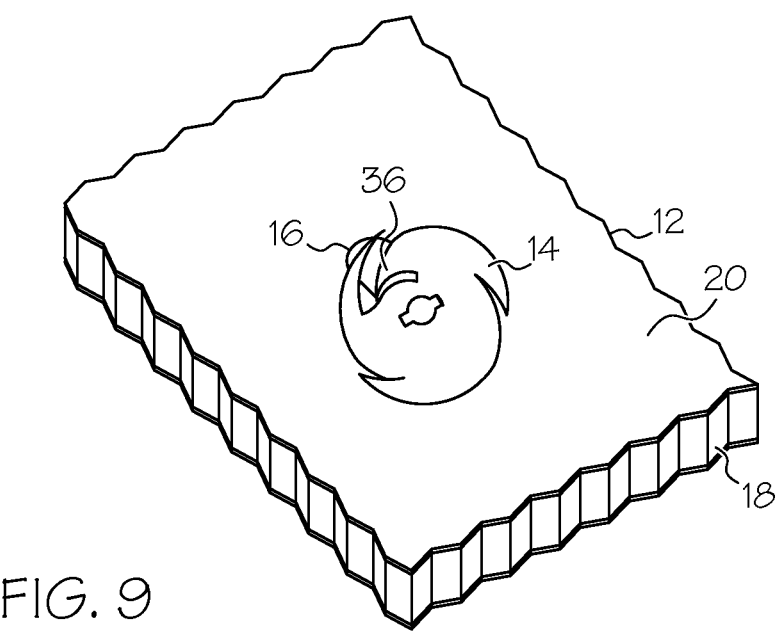
FIG. 9 is a perspective view of the positioning step of the method shown in FIG. 7.

At Block 104, the insert 14 may be positioned over the opening 16 in the first face sheet 20 of the sandwich panel 12, as shown in FIG. 9. For example, the vertical axis V (FIG. 2) of the insert 14 may be substantially centered over the opening 16 in the first face sheet 20 of the sandwich panel 12. To facilitate the next step (Block 106), the insert 14 may be positioned over the opening 16 such that the thread member 36 at least partially extends through the opening 16.

At Block 106, the insert 14 may be rotated about the vertical axis V relative to the opening 16, as shown by arrow $A_1$ in FIGS. 10-13. Rotation of the insert 14 may be effected by engaging the insert 14, specifically the recess 56 of the insert 14, with a driver tool 60. The driver tool 60 may be operated manually or may be powered (e.g., electrically powered, pneumatically powered or the like).

Thus, the insert 14 may start outside the sandwich panel 12 and then may be placed at the opening 16, which may serve as an entrance into the sandwich panel 12. Then, the insert 14 may be rotated through the opening 16 and into the sandwich panel 12 until the insert 14 is located below the inner surface 19 (FIG. 2) of the first face sheet 20. Therefore, rotation may serve as the means for inserting the insert 14 through the opening 16 in the sandwich panel 12.

Figure 13:
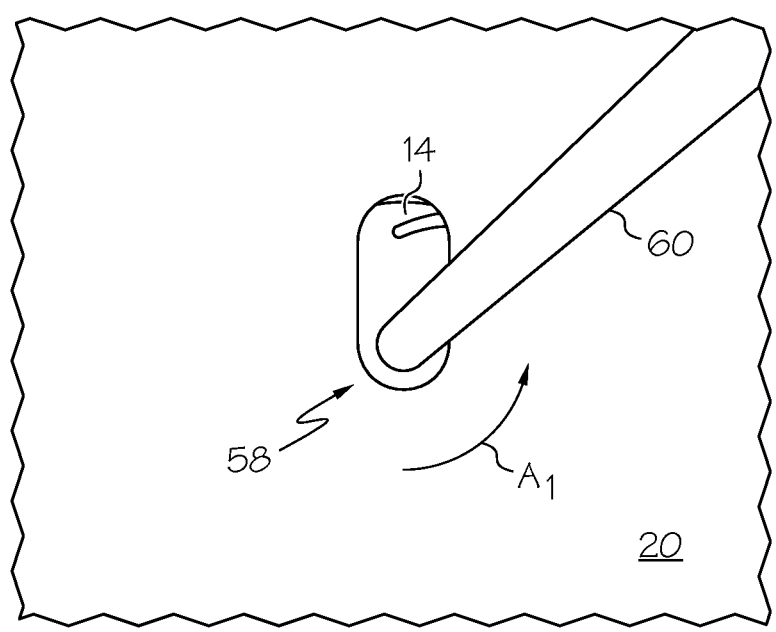
FIG. 13 is yet another perspective view of the rotating step of the method shown in FIG. 7.

Referring to FIGS. 10-13, rotation of the insert 14 about the vertical axis V may cause the thread member 36 of the insert 14 to engage the sandwich panel 12 and urge the insert 14 axially downward through the opening 16. After sufficient rotation (e.g., about 360 degrees), the insert 14 may be positioned entirely below the first face sheet 20 of the sandwich panel 12, as shown in FIG. 13.

Thus, the insert 14 may be inserted such that it is positioned below the first face sheet 20 of the sandwich panel 12 and the bore 54 of the insert 14 is aligned with the opening 16 of the sandwich panel 12. In one optional variation, a portion of the first face sheet 20 may be delaminated from the core 18 to facilitate receiving the insert 14 below the first face sheet 20 (e.g., between the first face sheet 20 and the core 18). In another optional variation, a portion of the core 18 may be removed (e.g., cut out) to form a void sized and shaped to accommodate the insert 14.

Figure 14:
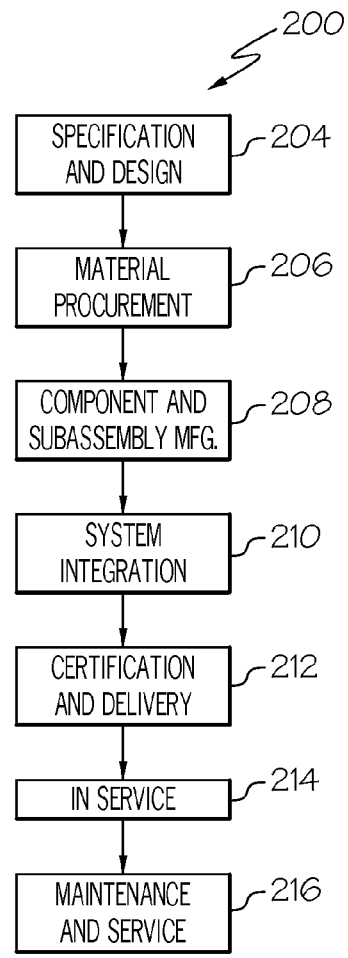
FIG. 14 is flow diagram of an aircraft manufacturing and service methodology.
Figure 15:
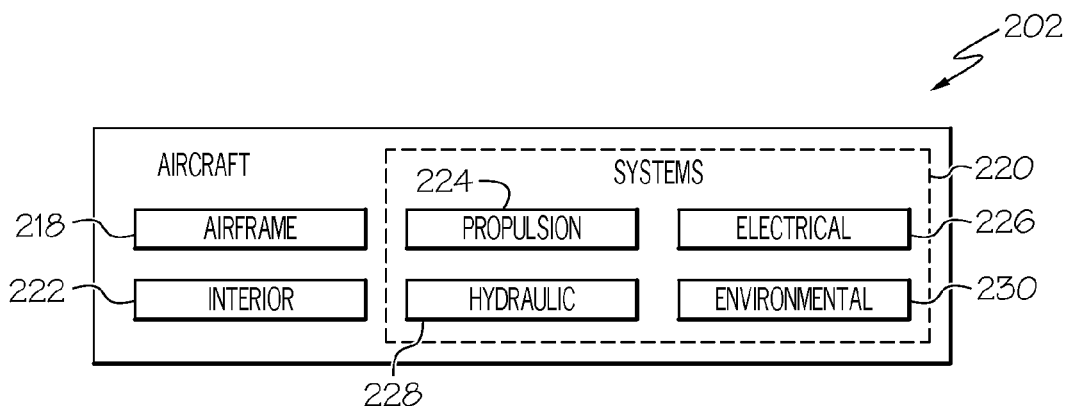
FIG. 15 is a block diagram of an aircraft.

Examples of the disclosure may be described in the context of an aircraft manufacturing and service method 200, as shown in FIG. 14, and an aircraft 202, as shown in FIG. 15. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included.

The disclosed panel-insert assembly 10 and method 100 may be employed during any one or more of the stages of the aircraft manufacturing and service method 200. As one example, components or subassemblies corresponding to component/subassembly manufacturing 208, system integration 210, and or maintenance and service 216 may be fabricated or manufactured using the disclosed panel-insert assembly 10 and method 100. As another example, the airframe 218 and the interior 222 may be constructed using the disclosed panel-insert assembly 10 and method 100. Also, one or more apparatus examples, method examples, or a combination thereof may be utilized during component/subassembly manufacturing 208 and/or system integration 210, for example, by substantially expediting assembly of or reducing the cost of an aircraft 202, such as the airframe 218 and/or the interior 222. Similarly, one or more of system examples, method examples, or a combination thereof may be utilized while the aircraft 202 is in service, for example and without limitation, to maintenance and service 216.

The disclosed system and method are described in the context of an aircraft; however, one of ordinary skill in the art will readily recognize that the disclosed service system may be utilized for a variety of different components for a variety of different types of vehicles. For example, implementations of the embodiments described herein may be implemented in any type of vehicle including, e.g., helicopters, passenger ships, automobiles and the like.

Although various embodiments of the disclosed panel-insert assembly and method have been shown and described, modifications may occur to those skilled in the art upon reading the specification. The present application includes such modifications and is limited only by the scope of the claims.

What is claimed is:

1. A method for connecting an insert to a panel, said panel comprising a core and a face sheet, said method comprising:
    forming an opening in said face sheet, wherein said opening comprises a maximum dimension;
    positioning said insert over said opening, wherein said insert comprises a substantially disk-shaped body comprising an outer periphery and an engagement surface, said engagement surface having a major dimension at least partially bound by said outer periphery, and wherein said major dimension of said engagement surface is greater than said maximum dimension of said opening;

rotating said insert relative to said opening to urge said insert through said opening and below said face sheet; and flushly abutting said engagement surface to an inner surface of said face sheet.

2. The method of claim 1 wherein said insert defines a vertical axis and a bore aligned with said vertical axis.

3. The method of claim 2 wherein said bore is threaded.

4. The method of claim 2 wherein said rotating said insert relative to said opening comprises rotating said insert in a first circumferential direction about said vertical axis.

5. The method of claim 4 wherein said insert further comprises a locking tooth that inhibits rotation of said insert in a second circumferential direction, said second circumferential direction being opposite of said first circumferential direction.

6. The method of claim 5 wherein said locking tooth is formed by a channel extending into said body from said outer periphery.

7. The method of claim 6 wherein said locking tooth protrudes upward relative to said engagement surface.

8. The method of claim 5 further comprising engaging said panel with said locking tooth in response to rotation of said insert in said second circumferential direction.

9. The method of claim 4 wherein said insert further comprises a thread member, and wherein rotation of said insert in said first circumferential direction causes said thread member to engage said panel.

10. The method of claim 9 wherein said positioning said insert over said opening comprises inserting said thread member through said opening.

11. The method of claim 9 wherein said thread member is formed by a channel extending into said body from said outer periphery.

12. The method of claim 11 wherein said locking tooth protrudes downward relative to said engagement surface.

13. The method of claim 9 further comprising axially urging along said vertical axis said insert into said panel in response to rotation of said insert in said first circumferential direction.

14. The method of claim 1 wherein said insert defines a recess, and wherein said rotating said insert relative to said opening comprises engaging said recess with a driver tool.

\* \* \* \* \*